(12) United States Patent
Ibrahim (10) Patent No.: US 9,037,165 B2
(45) Date of Patent: May 19, 2015

(54) METHOD AND SYSTEM FOR LOCATION BASED UPDATES IN A COMMUNICATIONS DEVICE

(71) Applicant: Broadcom Corporation, Irvine, CA (US)

(72) Inventor: Brima Babatunde Ibrahim, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/188,951

(22) Filed: Feb. 25, 2014

(65) Prior Publication Data

US 2014/0171127 A1    Jun. 19, 2014

Related U.S. Application Data

(63) Continuation of application No. 12/248,185, filed on Oct. 9, 2008, now Pat. No. 8,706,135.

(60) Provisional application No. 61/100,440, filed on Sep. 26, 2008.

(51) Int. Cl.
*H04W 24/00* (2009.01)
*H04W 4/02* (2009.01)
(Continued)

(52) U.S. Cl.
CPC ................ *H04W 4/025* (2013.01); *H04W 4/02* (2013.01); *H04W 8/18* (2013.01); *H04W 64/00* (2013.01); *H04W 88/02* (2013.01); *H04W 24/02* (2013.01)

(58) Field of Classification Search
None
See application file for complete search history.

(56) References Cited

U.S. PATENT DOCUMENTS

| 5,678,182 A | 10/1997 | Miller et al. |
| 6,908,389 B1 | 6/2005 | Puskala |

(Continued)

FOREIGN PATENT DOCUMENTS

| EP | 1037482 | 9/2000 |
| WO | WO0105174 | 1/2001 |
| WO | WO2008092855 | 8/2008 |

OTHER PUBLICATIONS

Foreign Office Action for related Chinese Patent Application mailed Feb. 28, 2012.

(Continued)

*Primary Examiner* — Suhail Khan
(74) *Attorney, Agent, or Firm* — McDermott Will & Emery LLP (57) ABSTRACT

The location or changes in location of a communications device may be determined by various means, such as via a satellite navigation system, within the communications device. The location of the communications device may then be used to determine communication standard parameters needed for operation. Different countries may require different parameters for various applications, such as digital video broadcasting (DVB) and/or Bluetooth communication. The communications device may then configure itself to use the appropriate parameters for operation using the determined standards. The configuration information may be stored in the communications device. The communications device may comprise at least one radio wireless communication that may need to be updated. The wireless communication may comprise cellular communication, Internet access, and reception of audio and/or video broadcasts, where the audio/video broadcasts may be analog and/or digital.

20 Claims, 6 Drawing Sheets

(51) Int. Cl.
*H04W 24/02* (2009.01)
*H04W 8/18* (2009.01)
*H04W 64/00* (2009.01)
*H04W 88/02* (2009.01)

(56) References Cited

U.S. PATENT DOCUMENTS

| | | |
|---|---|---|
| 7,260,415 B1 | 8/2007 | Oh |
| 7,340,266 B2 | 3/2008 | Robinson |
| 7,343,317 B2 | 3/2008 | Jokinen et al. |
| 8,014,809 B2 | 9/2011 | Bar-Ness et al. |
| 2003/0212684 A1 | 11/2003 | Meyer et al. |
| 2006/0135067 A1 | 6/2006 | Dunko |
| 2007/0019575 A1 | 1/2007 | Shaheen |
| 2007/0026825 A1 | 2/2007 | Wilson |
| 2007/0082699 A1 | 4/2007 | Karaoguz et al. |
| 2008/0270163 A1 | 10/2008 | Green |
| 2009/0213756 A1* | 8/2009 | Reddy et al. .......... 370/254 |

OTHER PUBLICATIONS

European summons to attend oral proceeding in related copending European application No. 09011774.8, mailed on Jan. 4, 2012.
European Search Report for European Patent Application Serial No. 09011774.8-2414, dated Jan. 26, 2010.

* cited by examiner

METHOD AND SYSTEM FOR LOCATION BASED UPDATES IN A COMMUNICATIONS DEVICE

CROSS-REFERENCE TO RELATED APPLICATIONS/INCORPORATION BY REFERENCE

This patent application is a continuation of U.S. patent application Ser. No. 12/248,185, filed on Oct. 9, 2008, which makes reference to, claims priority to, and claims the benefit of U.S. Provisional Application Ser. No. 61/100,440, filed on Sep. 26, 2008.

The above stated application is hereby incorporated herein by reference in its entirety.

FIELD OF THE INVENTION

Certain embodiments of the invention relate to communication systems. More specifically, certain embodiments of the invention relate to a method and system for integrating global navigation satellite system (GNSS), wireless local area network (WLAN), and cell phone technology.

BACKGROUND OF THE INVENTION

Each new generation of electronic devices may be able to handle an ever increasing number of applications. For example, it is common for a cell phone to be able to handle various cell phone protocols, such as GSM and CDMA. Various navigation devices, which may use, for example, the global positioning system (GPS), may also comprise Bluetooth capabilities. Many cell phones are also Bluetooth enabled. Accordingly, a wireless communication device may use IEEE 802.1x standard for WLAN and/or WiMax communication, Bluetooth SIG specification for Bluetooth communication, and/or one or more cellular protocols.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for integrating global navigation satellite system (GNSS), wireless local area network (WLAN), and cell phone technology, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for integrating global navigation satellite system (GNSS), wireless local area network (WLAN), and cell phone technology. Aspects of the invention may comprise determining, via a navigation satellite system receiver such as, for example, a GPS receiver, a Galileo receiver and/or a GLONASS receiver, which are integrated in or otherwise coupled to a mobile terminal, a location of the mobile terminal. The determined location of the mobile terminal may then be used to determine one or more communication standards and/or parameters needed for configuring and/or operating the mobile terminal. For example, different countries and/or regions may require different parameters for various applications, such as digital video broadcasting (DVB) and/or Bluetooth communication. The mobile terminal may then configure itself using the appropriate parameters for operation using the determined communication standard(s). The configuration information may be stored, for example, in the mobile terminal. The mobile terminal may comprise at least one radio wireless communication, where the radio configuration may need to be updated for different countries. The wireless communication may comprise cellular communication, Internet access, and/or reception of audio and/or video broadcasts, where the audio/video broadcasts may be analog and/or digital.

Figure 1A:
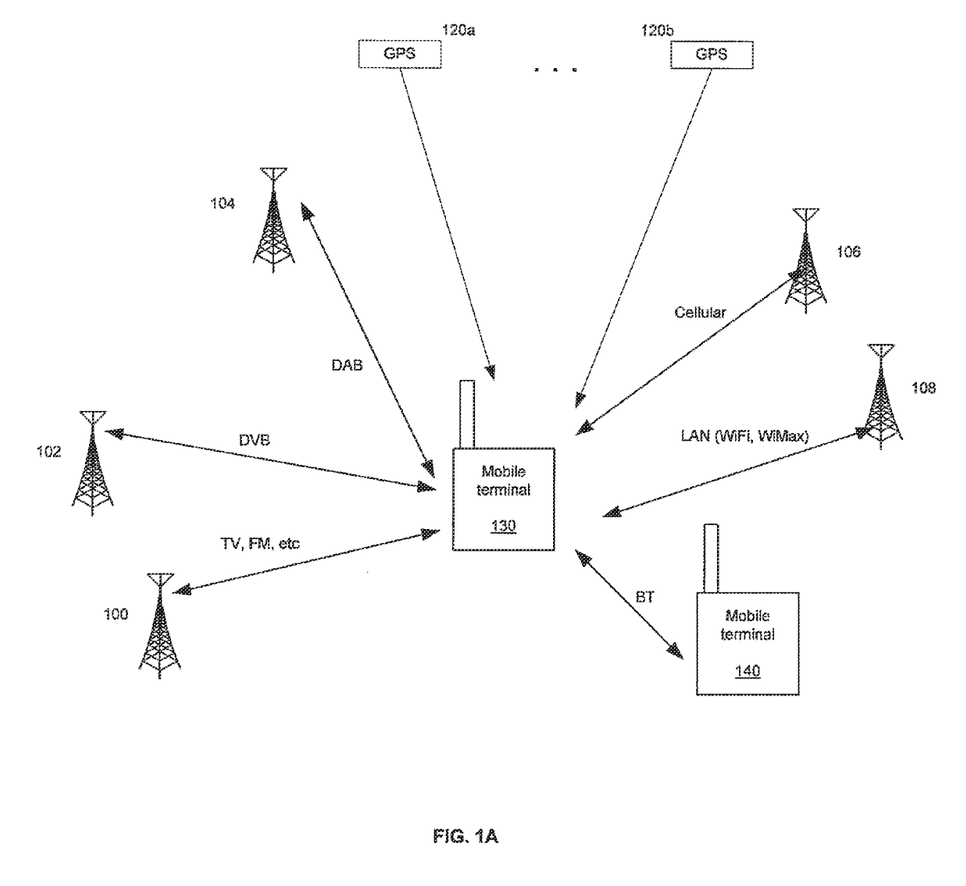
FIG. 1A is a diagram of an exemplary system for communicating wireless information using a plurality of wireless communication protocols, in accordance with an embodiment of the invention.

FIG. 1A is a diagram of an exemplary system for communicating wireless information using a plurality of wireless communication protocols, in accordance with an embodiment of the invention. Referring to FIG. 1A, there are shown a plurality of wireless network systems 100, 102, 104, 106, and 108, GPS satellites 120a, ..., 120b, and mobile terminals 130 and 140. The wireless network systems 100, 102, 104, 106, and 108 may comprise, for example, multi-media broadcasting systems such as digital television broadcasting (DTV) systems and/or digital audio broadcasting (DAB) systems, as well as analog or digital television/radio broadcasting systems. Although GPS satellites 120a, ..., 120b are illustrated, the invention is not limited in this regard. Accordingly, other satellites such as GLONASS, for example, may be utilized without departing from the spirit and scope of the invention.

The wireless network system 100 may comprise suitable circuitry, logic, and/or code that may enable communication of analog and/or digital television and/or FM signals. The wireless network system 102 may comprise suitable circuitry, logic, and/or code that may enable communication of digital video broadcast (DVB) signals. The wireless network system 104 may comprise suitable circuitry, logic, and/or code that may enable communication of digital audio broadcast (DAB)

signals. The wireless network system 106 may comprise suitable circuitry, logic, and/or code that may enable transmission and/or reception of cellular signals. In an exemplary embodiment of the invention, the wireless network system 106 may be operable to handle one or more cellular communication standards comprising 2G, 2.5G, 3G and/or 4G communication. The wireless network system 108 may comprise suitable circuitry, logic, and/or code that may enable transmission and/or reception of RF signals that may be used for accessing the Internet. In an exemplary embodiment of the invention, the wireless network system 108 may be operable to handle one or more wireless communication standards comprising WPAN (Bluetooth and/or ZigBee, WLAN, and/or WiMax). Portions of the wireless network system 108 may also comprise wired components.

The GPS satellites 120a, . . . , 120b may transmit signals that may enable a user with appropriate GPS navigation receiver to locate the user's position on Earth. The mobile terminals 130 and 140 may comprise suitable logic, circuitry, and/or code that may enable reception and/or transmission of signals for various wireless network systems.

In operation, the mobile terminal 130 may receive and/or transmit signals to and from the wireless network systems 100 . . . 108. The mobile terminal 130 may also communicate via cellular frequencies in the wireless network system 106. The cellular frequencies may comprise, for example, various frequency bands used by various cellular service vendors in the world. The mobile terminal 130 may also communicate with wireless network systems 108, where the wireless network systems may comprise, for example, local area networks (LAN) and wide area networks such as WiMax. The mobile terminal 130 may also communicate with other electronic devices, such as, for example, the mobile terminal 140 using Bluetooth standard. The mobile terminal 130 may also be enabled to provide navigation capability using a global navigation system such as, for example, global positioning system (GPS), the European navigation satellite system Galileo, and/or global navigation satellite system (GLONASS). Accordingly, the mobile terminal 130 may be able to locate its position by using signals from satellites such as, for example, the GPS satellites 120a, . . . , 120b.

In an exemplary embodiment of the invention, the mobile terminal 130 may be enabled to determine its location based on, for example, a global navigation satellite system (GNSS). For example, the mobile terminal 130 may be enabled to determine its location based on information received from the GPS satellite 120a, . . . , 120b. Once the location of the mobile terminal 130 has been determined, the mobile terminal 130 may then determine proper standards and/or parameters that may be utilized to enable communication via wireless and/or communication interfaces that may be available via the mobile terminal. The determination of the proper standard and/or parameters may be based, for example, on a determination of country and/or region that correlates to the determined location. The mobile terminal 130 may then configure itself to enable supporting available wireless and/or communication interfaces based on the determined standards and/or parameters to enable continued support of the available wireless and/or communication interfaces in a new location. In an exemplary embodiment of the invention, the mobile terminal 130 may be enabled to reconfigure itself to utilize the proper frequency bands and/or bandwidth that may be used to enable universal mobile telecommunication system (UMTS), LTE, WCDMA, GSM, GPRS, EDGE, HSPA (HSDPA, HSUPA), GLONASS, GPS, Galileo, WLAN, WiMax, ZigBee, and/or Bluetooth communication. Where it may determine that a new location corresponds to a new region, a determination whether a different bandwidth may be utilized in UMTS, LTE, WCDMA, GSM, GPRS, EDGE, HSPA (HSDPA, HSUPA), GLONASS, GPS, WLAN, WiMax, ZigBee, DVB-H and/or Bluetooth communication than the bandwidths utilized for in the previous location may be made via the mobile terminal 130.

Figure 1B:
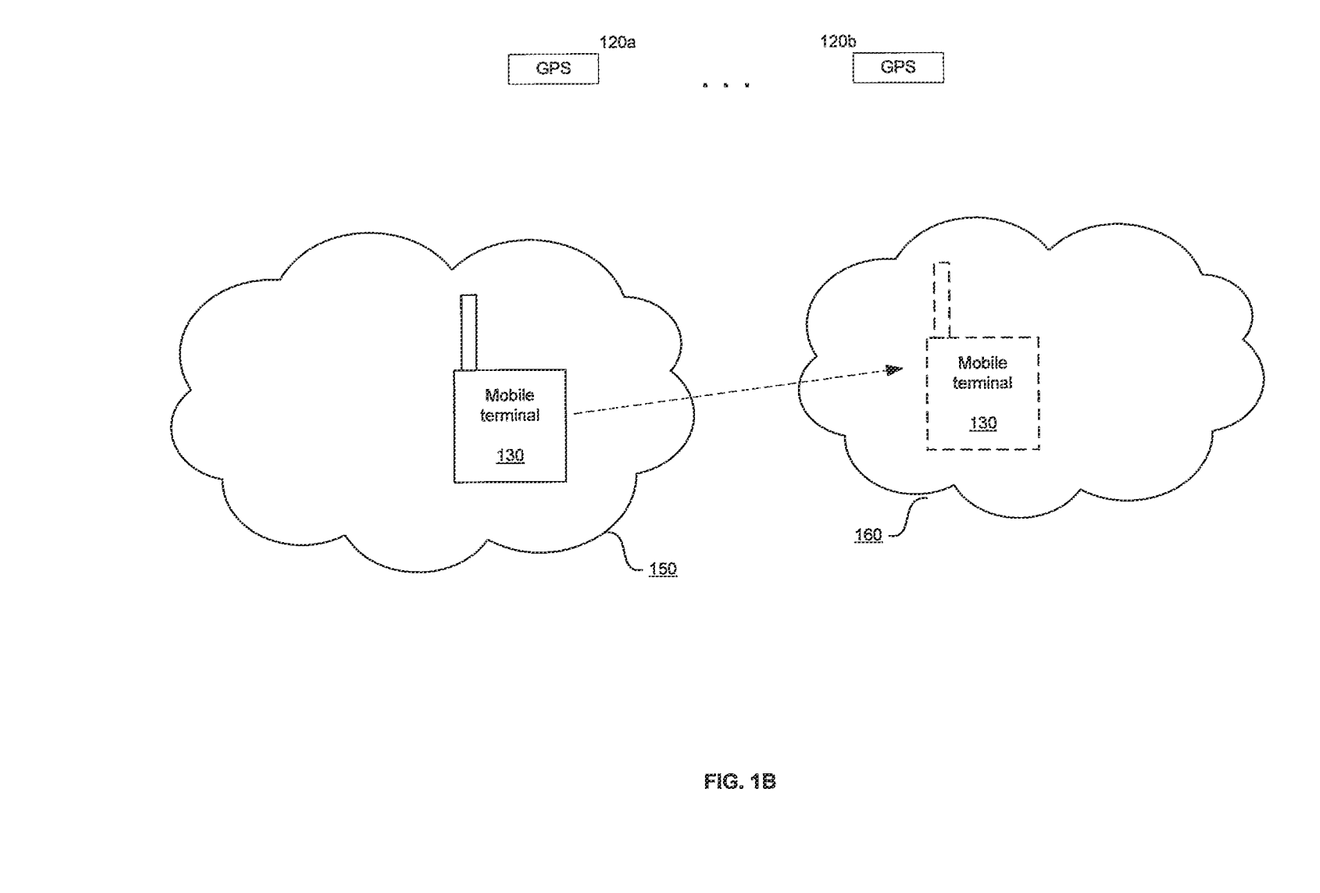
FIG. 1B is a diagram illustrating an exemplary mobile terminal migrating from one country to another, in accordance with an embodiment of the invention.

FIG. 1B is a diagram illustrating an exemplary mobile terminal migrating from one country to another, in accordance with an embodiment of the invention. Referring to FIG. 1B, there are shown the GPS satellites 120a, . . . , 120b and the mobile terminal 130. The mobile terminal 130 may receive signals from the GPS satellites 120a, . . . , 120b, and accordingly be able to use its navigation capabilities to locate its position as geographical location 150. The mobile terminal may then be carried by its owner (not shown) to a new geographical location 160. Accordingly, by using its navigation capabilities, the mobile terminal 130 may be able to determine its new geographical location, including the information on whether, for example, the geographical location 160 may be a different country with respect to the geographical location 150.

The location information may then be used to configure the mobile terminal 130 for use in that country. Various parameters may need to be changed in order to make use of specific wireless services. For example, South Korea, various European countries, and the United States may use different DVB-handheld (DVBH) standards where the allocated DVBH frequencies, frequency spacing, and decoding methods may be different from country to country. Various countries may also allow different transmit power, for example, for Bluetooth devices. Accordingly, the transmit power levels may need to be changed from country to country, as well as receiver sensitivity and gain.

Figure 2:
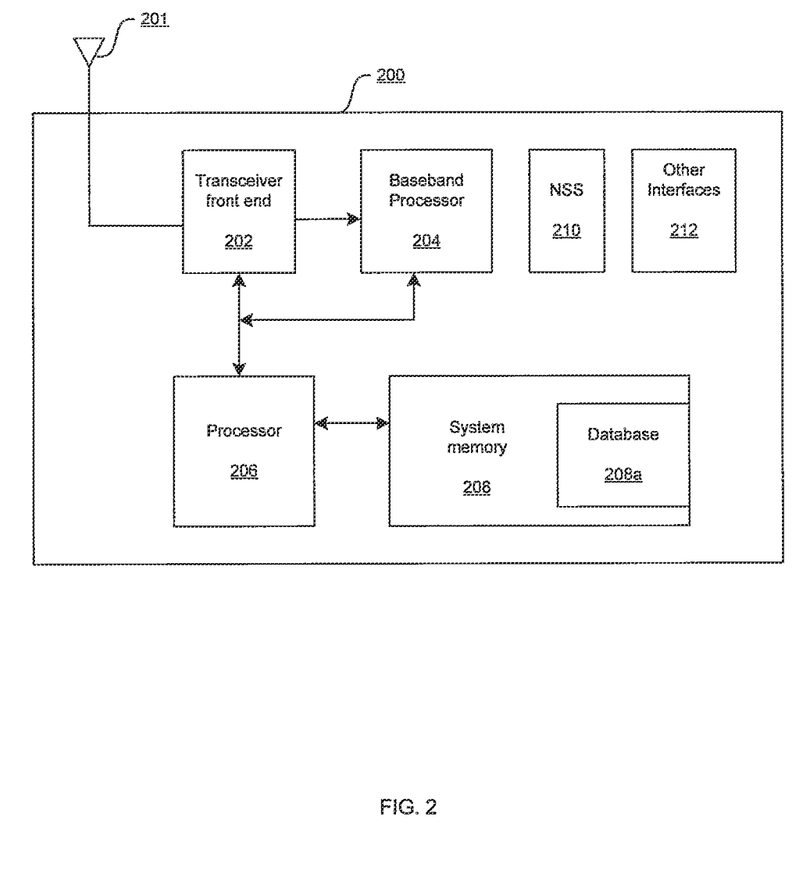
FIG. 2 is a diagram illustrating an exemplary mobile terminal comprising integrated global navigation satellite system (GNSS), wireless local area network (WLAN), and cell phone technology, in accordance with an embodiment of the invention.

FIG. 2 is a diagram illustrating an exemplary mobile terminal comprising integrated global navigation satellite system (GNSS), wireless local area network (WLAN), and cell phone technology, in accordance with an embodiment of the invention. Referring to FIG. 2, there is shown a mobile terminal 200, which may be similar to the mobile terminal 130. Accordingly, the mobile terminal 200 may comprise suitable logic, circuitry, and/or code that may enable wireless communication via a wireless network. The mobile terminal 200 may comprise, for example, an antenna 201, a transceiver front end 202, a baseband processor 204, a processor 206, system memory 208, navigation satellite system interface 210, and various navigation interfaces 212.

The antenna 201 may comprise suitable logic and/or circuitry that may enable reception and/or transmission of signals. The transceiver front end 202 may comprise suitable logic, circuitry, and/or code that may enable processing analog signals for transmission and/or processing received analog signals. The transceiver front end 202 may be operable, for example, to amplify, filter, and/or up-convert/down-convert analog signals. The baseband processor 204 may comprise suitable logic, circuitry, and/or code that may enable processing of signals received from the transceiver front end 202 and/or signals to be communicated to the transceiver front end 202. The baseband processor 204 may, for example, recover signal integrity where signals may have been corrupted during transmission.

The processor 206 may comprise suitable logic, circuitry, and/or code that may enable executing various software/firmware instructions. The processor 206 may, for example, control operation of the transceiver front end 202 and/or the baseband processor 204. The system memory 208 may comprise suitable logic and/or circuitry that may enable storage of information, such as, for example, data, and/or code. The system memory 208 may comprise, for example, a database 208a of information regarding wireless communication standards for different countries. The system memory 208 may comprise volatile and/or non-volatile memory. Non-volatile memory may comprise, for example, FLASH memory and hard drives.

The navigation satellite system interface 210 may comprise suitable logic, circuitry, and/or code that may enable reception of signals from satellites that may be used for determining location of the mobile terminal 200. For example, the navigation satellite system interface 210 may be operable to determine a location of the mobile terminal 200 based on signals received from the GPS satellites 120a, . . . , 120b. The navigation satellite system interface 210 may also be operable, for example, to determine a location of the mobile terminal 200 based on signals received from GLONASS and/or Galileo satellites (not shown).

Various navigation interfaces 212 may comprise suitable logic, circuitry, and/or code that may enable reception of signals that may be used for navigation, where the signals may be transmitted by devices other than satellites that belong to a navigation satellite system such as, for example, GPS, Galileo and/or GLONASS.

The mobile terminal 200 may comprise suitable logic, circuitry and/or code that may be operable to enable communication via one or more of the following technologies or protocols comprising UMTS, LTE, WCDMA, GSM, GPRS, EDGE, HSPA (HSDPA, HSUPA), GLONASS, GPS, Galileo, WLAN, WiMax, ZigBee, DVB-H and Bluetooth. The mobile terminal 200 may be configured to operate using various communication standards in various parts of the world. For example, the mobile terminal 200 may be configured for cellular communication, Bluetooth communication, WiFi and/or WiMax communication, and/or reception of various multi-media transmissions via the wireless network systems 100 . . . 108.

Even when the mobile terminal 200 is enabled for a specific wireless standard, the mobile terminal 200 may need to be further configured if it moves from one region to another or from one country to another. For example, the mobile terminal 200 may be compliant with the universal mobile telecommunication system (UMTS) standard. However, the mobile terminal 200 may still need to be configured to use different frequency spectrums depending on which country the mobile terminal 200 is being used. Similarly, the mobile terminal 200 may use Bluetooth standard to communicate with, for example, the mobile terminal 140. However, depending on the country that the mobile terminal 200 is being used in, the transmit power of the mobile terminal 200 may need to be adjusted. There may be instances when the mobile terminal may move from one region or location to another region or location, but operation at the latter region or location may be minimal or suboptimal. Accordingly, various embodiments of the invention may reconfigure the mobile terminal 200 with updated parameters that may be specified based on a determination of the latter location.

The mobile terminal 200 may use its navigation system, for example, the navigation satellite system interface 210 and/or various navigation interfaces 212, to determine its geographical location. For example, the navigation satellite system interface 210 may be used allow determination of its geographical location using GPS satellites 120a, . . . , 120b. The mobile terminal 200 may then determine whether it may need to be configured for use in the present region. In instances where configuration may be required, the mobile terminal may be configured using one or more default parameters and/or one or more enhanced parameters. In accordance with various embodiments of the invention, one or more profiles may be stored within the mobile terminal, at the servicing service provider and/or the subscribed service provider. The profiles may comprise parameters and/or information specifying how the mobile terminal 200 should be configured using the default and/or enhanced parameters. The enhanced parameters may be utilized to provide enhanced services, for example, premium services or features. The profiles may be managed by a user of the mobile terminal 200 and/or by the subscribed service provider. For profiles that are stored at the servicing service provider and/or the subscribed service provider, information from the profile may be pushed to the mobile terminal 200, requested by the mobile terminal, and/or otherwise communicated to the mobile terminal when the mobile terminal changes location and/or when configuration may be required. The profile information may be communicated in-band and/or out-of-band.

While the mobile terminal 200 may be enabled for wireless communication, the mobile terminal 200 may also be enabled for wired communication using a cable, for example, to access a network or a communication system. For example, the cable may be a universal serial bus (USB) cable or an Ethernet cable.

Figure 3:
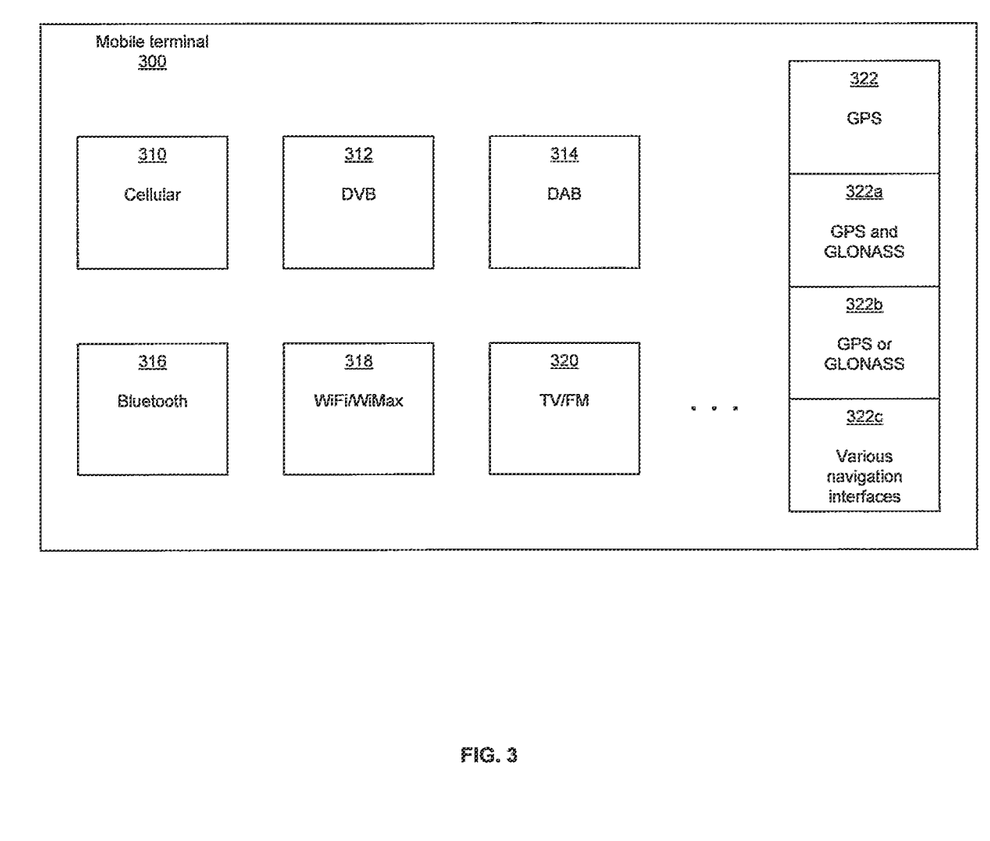
FIG. 3 is a diagram illustrating a plurality of exemplary functions available to a mobile terminal, in accordance with an embodiment of the invention.

FIG. 3 is a diagram illustrating a plurality of exemplary functions available to a mobile terminal, in accordance with an embodiment of the invention. Referring to FIG. 3, there is shown a mobile terminal 300, which may be similar to the mobile terminal 200. The mobile terminal 300 may be enabled, for example, for cellular communication via the cellular interface 310, DVB reception via the DVB interface 312, DAB reception via the DAB reception via the DAB interface 314, Bluetooth communication via the Bluetooth interface 316, and/or network access via the WiFi/WiMax interface 318. Various embodiments of the invention may comprise other interfaces such as, for example, the television/FM interface 320 that may enable the mobile terminal 300 to receive analog and/or digital television signals, and/or analog and/or digital FM signals. Various embodiments of the invention may also comprise, for example, a navigation system interface, such as the navigation interface 322.

The navigation interface 322 may comprise, for example, an integrated GPS and GLONASS receiver 322a, and/or a non-integrated GPS and GLONASS receiver 322b. The navigation interface 322 may also comprise various interfaces 322c that may be similar to the various navigation interfaces 212, which may comprise, for example, a Galileo receiver. While certain permutations may have been shown, the invention need not be so limited. For example, various embodiments of the invention may comprise the navigation interface 322 where the navigation interfaces may be integrated, for example in a single chip or two or more chips. Various embodiments of the invention may comprise the navigation interface 322 where all the navigation interfaces may be discrete. There may also be a plurality of embodiments of the invention where there may be different levels of integration of the navigation interfaces.

The interfaces 310 . . . 322, which may comprise radios, may comprise logic, circuitry, and/or code that may enable interfacing with at least one of the wireless network systems 100 . . . 108, and 120a, . . . , 120b, as well as interfacing via Bluetooth standard with another wireless device such as, for example, the mobile terminal 140. Accordingly, the mobile terminal 300 may comprise receive and/or transmit circuitry, which may have similar functionality to the circuits described with respect to FIGS. 4A and 4B.

The mobile terminal 300 may be configured to operate using various communication standards in various parts of the world. For example, the mobile terminal 300 may be configured for cellular communication, Bluetooth communication, WiFi and/or WiMax communication, and/or reception of various multi-media transmissions via the wireless network systems 100 . . . 108.

Even when the mobile terminal 300 is enabled for a specific wireless standard, the mobile terminal 300 may need to be further configured if it moves from one region to another or from one country to another. For example, the mobile terminal 300 may be compliant with the universal mobile telecommunication system (UMTS) standard, and accordingly may use the cellular interface 310. However, if a user of the mobile terminal 300 moves from the United States to Europe, the mobile terminal 300 may need to be configured to use different frequency spectrums.

For example, the mobile terminal 300 may be configured to use 1710-1755 MHz and 2110-2155 MHz spectrums for uplink and downlink, respectively, in the United States. However, the mobile terminal 300 may need to be configured to use 1885-2025 MHz and 2110-2200 MHz spectrums for uplink and downlink, respectively, in Europe. Other parts of the world may use still other spectrums.

Similarly, the mobile terminal 300 may use Bluetooth standard to communicate with, for example, the mobile terminal 140. However, depending on the country that the mobile terminal 300 is being used in, the transmit power of the mobile terminal 300 may need to be adjusted. For example, some European countries may allow higher transmission power levels than the United States. Accordingly, the mobile terminal 300 may use its navigation interface 322 that may allow determination of its geographical location using signals received from, for example, GPS satellites 120a, . . . , 120b. While the navigation satellites may have been described as GPS satellites, the invention need not be so limited. For example, various embodiments of the invention may enable reception of signals via a global navigation satellite system (GLONASS) interface, and or other interfaces, such as an interface for the European navigation satellite system Galileo.

The mobile terminal 300 may then determine what specific region or country it may be in, and, accordingly, it may configure the mobile terminal 300 for use in the present region. The configuring may comprise, for example, uplink and downlink frequencies and power levels. In some instances, the mobile terminal 300 may determine whether a new standard may need to be used. For example, if there is no support for UMTS cellular service in a foreign country, the mobile terminal 300 may determine which other service providers may be available, for example, via a database in the mobile terminal 300, and may configure the mobile terminal 300 for the standard appropriate for that service provider.

Figure 4A:
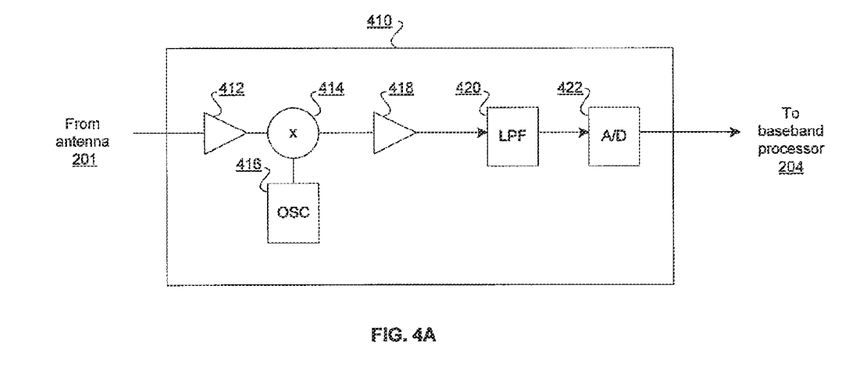
FIG. 4A is a diagram of an exemplary receive path in a mobile terminal, in accordance with an embodiment of the invention.

FIG. 4A is a diagram of an exemplary receive path in a mobile terminal, in accordance with an embodiment of the invention. Referring to FIG. 4A, there is shown an exemplary receiver front end 410, which may be a part of the transceiver front end 202, for example. The receiver front end 410 may comprise amplifiers 412 and 418, a mixer 414, a local oscillator 416, a low pass filter 420, and an analog-to-digital converter 422. The amplifiers 412 and/or 418 may be, for example, low noise amplifiers.

In operation, the amplifier 412 may be a low noise amplifier that may amplify received RF signals from the antenna 201. The mixer 414 may be an amplifying mixer that may down-convert the frequency of the input signal to generate an output signal. The output signal may also have an amplitude gain with respect to the amplitude of the input signal.

The frequency of the output signal of the mixer 414 may depend on, for example, a frequency of a signal generated by the local oscillator 416. The output frequency may be a difference of the frequency of the signal from the amplifier 412 and the frequency of the signal from the local oscillator 416. The output of the mixer 414 may be communicated to the amplifier 418, which may generate an output signal that may have an amplitude gain with respect to the amplitude of the input signal.

The output of the amplifier 418 may be communicated to the low pass filter 420. The low pass filter 420 may attenuate frequencies above a determined frequency, while passing frequencies below the determined frequency. The low pass filter 420 may also provide amplification to the filtered signal such that the amplitude of the output signal may have a gain with respect to the amplitude of the input signal. The output of the low pass filter 420 may be communicated to the analog-to-digital converter 422. The analog-to-digital converter 422 may convert the analog signals to digital signals by periodically sampling the analog signals. The output of the analog-to-digital converter 422 may be communicated, for example, to the baseband processor 204 for further processing.

The various components in the receiver front end 410 may be controlled, for example, by the processor 206. For example, gain of the amplifiers 412 and 418, as well as the mixer 414 and the low pass filter 420 may be adjusted up or down to provide appropriate signal levels at each block. The frequency of the signal generated by the local oscillator 416 may also be controlled so that the mixer 414 may generate an output with a constant frequency as the frequency of the signal from the amplifier 412 varies. This may allow the mobile terminal to tune to different channels, or frequencies.

The ability to control various parameters for the receiver front end 410 may be useful in instances when the mobile terminal 300 is intended for use in various parts or regions of the world where different standards may be utilized, and when different parameter requirements may be specified for a single standard in the various regions. For example, various countries may specify different parameters for DVB-handheld (DVBH) standard. The parameters that may be varied may be frequencies allocated for transmission, frequency spacing, and decoding method. Various countries may also allow different transmit power, for example, for Bluetooth devices. Accordingly, gain for the various components in the receiver front end 410 may need to optimize for power levels of the received signals. Additionally, the local oscillator 416 may be controlled to output a desired frequency for proper down-conversion of the received RF signals.

For example, the mobile terminal 300 may comprise a multi-band, multi-standard cellular phone. For example, the mobile terminal 300 may be compliant with the universal mobile telecommunication system (UMTS) standard, and accordingly may use the cellular interface 310. However, if a user of the mobile terminal 300 moves from the United States to Europe, the mobile terminal 300 may need to be configured to use different frequency spectrums. For example, the mobile terminal 300 may be configured to use 1710-1755 MHz and 2110-2155 MHz spectrums for uplink and downlink, respectively, in the United States. However, the mobile terminal 300 may need to be configured to use 1885-2025 MHz and 2110-2200 MHz spectrums for uplink and downlink, respectively, in Europe. Other parts of the world may use still other spectrums.

Accordingly, the mobile terminal 300 may use its navigation interface 322 that may allow, for example, determination of its geographical location using signals received from the GPS satellites 120a, . . . , 120b. The mobile terminal 300 may then determine what specific region or country it may be in, and, accordingly, it may configure the mobile terminal 300 for use in the present region. While the navigation satellites may have been described as GPS satellites, the invention need not be so limited. For example, various embodiments of the invention may enable reception of signals via a global navigation satellite system (GLONASS) interface, and/or other interfaces, such as for the European satellite navigation system Galileo.

The configuring may comprise, for example, uplink and downlink frequencies and power levels. In some instances, the mobile terminal 300 may determine whether a new standard may need to be used. For example, if there is no support for UMTS cellular service in a foreign country, the mobile terminal 300 may determine which other service providers may be available, for example, via a database in the mobile terminal 300, and may configure the mobile terminal 300 for the standard appropriate for that service provider.

An electronic device such as the mobile terminal 300 that has a capability to process a plurality of signals, such as, for example, cellular signals and global navigation satellite signals, may comprise a plurality receiver front ends 410. Additionally, while an exemplary receiver front end 410 may have been described with respect to FIG. 4A, an embodiment of the invention may be used with various implementations of a receiver front end.

Figure 4B:
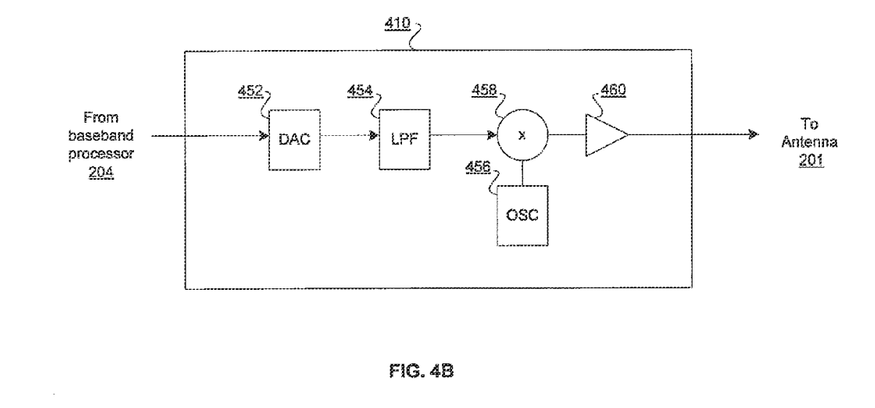
FIG. 4B is a diagram of an exemplary transmit path in a mobile terminal, in accordance with an embodiment of the invention.

FIG. 4B is a diagram of an exemplary transmit path in a mobile terminal, in accordance with an embodiment of the invention. Referring to FIG. 4B, there is shown an exemplary transmitter front end 450, which may be a part of the transceiver front end 202, for example. The transmitter front end 450 may comprise a digital-to-analog converter 452, a low pass filter 454, a local oscillator 456, a mixer 458, and a power amplifier 460.

In operation, the digital-to-analog converter 452 may receive digital signals from, for example, the baseband processor 204. The digital-to-analog converter 452 may convert the digital signals to analog signals, and the analog signals may be communicated to the low pass filter 454. The low pass filter 454 may attenuate frequencies above a determined frequency, while passing frequencies below the determined frequency. The low pass filter 454 may also provide amplification to the filtered signal such that the amplitude of the output signal may have a gain with respect to the amplitude of the input signal. The output of the low pass filter 454 may be communicated to the mixer 458.

The mixer 458 may be an amplifying mixer that may up-convert the frequency of the input signal to generate an output signal. The output signal may also have an amplitude gain with respect to the amplitude of the input signal. The frequency of the output signal of the mixer 458 may depend on, for example, a frequency of a signal generated by the local oscillator 456. The output frequency may be a sum of the frequency of the signal from the low pass filter 454 and the frequency of the signal from the local oscillator 456. The output of the mixer 458 may be communicated to the amplifier 460, which may generate an output signal that may have an amplitude gain with respect to the amplitude of the input signal. The amplifier 460 may be a power amplifier whose output may be transmitted by the antenna 201, for example.

The various components in the receiver front end 450 may be controlled, for example, by the processor 206. For example, gain of the amplifiers 460, as well as the mixer 458 and the low pass filter 454 may be adjusted up or down to provide appropriate signal levels at each block. The frequency of the signal generated by the local oscillator 456 may also be controlled so that the mixer 458 may generate a desired output frequency for transmission. This may allow the mobile terminal to transmit at different channels, or frequencies.

The ability to control various parameters for the transmitter front end 450 may be useful in instances when the mobile terminal 300 is intended for use in various parts of the world where different parameter requirements may be specified for a single standard, or where different standards are used in different parts of the world. For example, various countries may specify different parameters for DVB-handheld (DVBH) standard. The parameters that may vary may be frequencies allocated for use, frequency spacing, and decoding method. Various countries may also allow different transmit power, for example, for Bluetooth devices.

For example, the mobile terminal 300 may comprise a multi-band, multi-standard cellular phone. For example, the mobile terminal 300 may be compliant with the universal mobile telecommunication system (UMTS) standard, and accordingly may use the cellular interface 310. However, if a user of the mobile terminal 300 moves from the United States to Europe, the mobile terminal 300 may need to be configured to use different frequency spectrums. For example, the mobile terminal 300 may be configured to use 1710-1755 MHz and 2110-2155 MHz spectrums for uplink and downlink, respectively, in the United States. However, the mobile terminal 300 may need to be configured to use 1885-2025 MHz and 2110-2200 MHz spectrums for uplink and downlink, respectively, in Europe. Other parts of the world may use still other spectrums.

Accordingly, the mobile terminal 300 may use its navigation interface 322 that may allow, for example, determination of its geographical location using signals received from the GPS satellites 120a, . . . , 120b. The mobile terminal 300 may then determine what specific region or country it may be in, and, accordingly, it may configure the mobile terminal 300 for use in the present region. While the navigation satellites may have been described as GPS satellites, the invention need not be so limited. For example, various embodiments of the invention may enable reception of signals via a global navigation satellite system (GLONASS) interface, and/or other interfaces, such as for the European satellite navigation system Galileo.

The configuring may comprise, for example, uplink and downlink frequencies and power levels. In some instances, the mobile terminal 300 may determine whether a new standard may need to be used. For example, if there is no support for UMTS cellular service in a foreign country, the mobile terminal 300 may determine which other service providers may be available, for example, via a database in the mobile terminal 300, and may configure the mobile terminal 300 for the standard appropriate for that service provider.

An electronic device such as the mobile terminal 300 that has a capability to process a plurality of signals, such as, for example, cellular signals and global navigation satellite signals, may comprise a plurality transmitter front ends 450. Additionally, while an exemplary transmitter front end 450 may have been described with respect to FIG. 4B, an embodiment of the invention may be used with various implementations of a transmitter front end.

Figure 5:
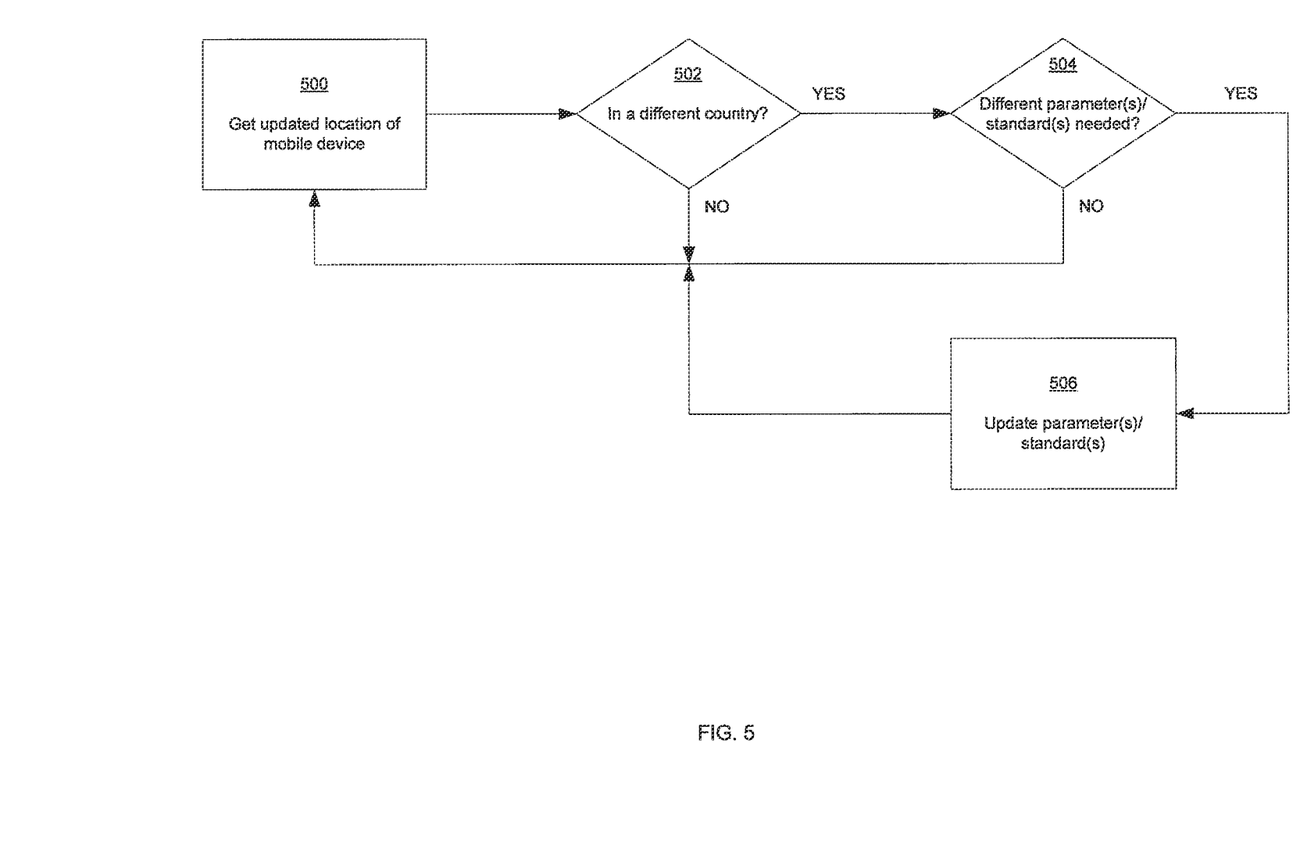
FIG. 5 is a flow diagram illustrating exemplary steps for updating configuration in a mobile terminal as the mobile terminal migrates, in accordance with an embodiment of the invention.

FIG. 5 is a flow diagram illustrating exemplary steps for updating configuration in a mobile terminal as the mobile terminal migrates, in accordance with an embodiment of the invention. Referring to FIG. 5, there are shown steps 500 to 506. In step 500, an electronic device such as, for example, the mobile terminal 130, may monitor its location via a satellite navigation system. The satellite navigation system may be, for example, a GNSS network such as GPS.

In step 502, the mobile terminal 130 may determine whether the geographical location determined in step 500 may indicate that the mobile terminal 130 may be in a different country than the last time the geographical location was determined. If so, the next step may be step 504. Otherwise, the next step may be step 500.

Step 502 may take place periodically since it may be assumed that the mobile terminal 130 may not go from one country to another in a matter of seconds. The period of time between determinations of whether the mobile terminal 130 is in a new country may be set to a default setting, where the default setting may be changed.

In step 504, the mobile terminal may determine whether the new country may use different parameters for a wireless standard, and/or whether a different standard may need to be used. For example, in an instance where a user of the mobile terminal 130 traveled from the United States to France, the mobile terminal 130 may need to reconfigure its Bluetooth receiver and transmitter for different power levels. The mobile terminal 130 may also need to reconfigure DVBH parameters to use different frequency bands and/or decoding algorithms. This information may be stored, for example, in a database. The database may be, for example, the database 208a in the system memory 208. If any parameter needs to be changed, the next step may be step 506. Otherwise, the next step may be step 500.

In step 506, the mobile terminal 130 may configure various parameters as required for the new country. The mobile terminal 130 may now be ready to receive multi-media data and/or communicate via wireless networks since it may be appropriately configured for operation in a new country.

In accordance with an exemplary embodiment of the invention, the mobile terminal 130 may determine its location via a satellite navigation system such as, for example, GPS, Galileo and/or GLONASS. The mobile terminal 130 may determine whether it may be in a same country as the last time its position was determined. In instances where the mobile terminal 130 may have moved to a different country, the mobile terminal 130 may determine whether one or more standards used for wireless communication in the mobile terminal may need to be updated. If so, the mobile terminal 130 may configure itself for operation using the standards for the new country. The configuration may be performed, for example, by the processor 206 using information that may be in a database 208a in the system memory 208.

The wireless communication may comprise, for example, cellular communication, access to networks such as the Internet, and/or reception and/or transmission of multimedia files. The wireless communication may also enable, for example, reception of audio and/or television signals, where the audio and/or television signals may be analog and/or digital.

In accordance with an exemplary embodiment of the invention, a satellite navigation system receiver, such as, for example, the navigation interface 322 integrated within or otherwise coupled to a mobile terminal 300 may determine a location of the mobile terminal 300. The location of the mobile terminal 300 may be determined via, for example, the navigation interface 322, which may be operable as a global positioning system (GPS) receiver, a Galileo receiver and/or a global navigation satellite system (GLONASS) receiver.

Accordingly, based on the location of the mobile terminal 300, one or more parameters corresponding to one or more standards utilized for at least one application in the mobile terminal. For example, some exemplary parameters may comprise uplink and downlink frequencies for a cellular standard, such as, for example, UMTS, which may vary from country to country. The mobile terminal 300 may then be configured with the parameters appropriate for the geographic location, such as, for example, the country or the region where the mobile terminal 300 may now be located. Accordingly, the mobile terminal 300 may be used for cellular communication via operation of at least one application in the mobile terminal 300.

The various parameters that may be used to configure the mobile terminal 300 may be stored, for example, in the database 208a in the system memory 208. Accordingly, the parameters may be used to update at least one of the radios that may be associated with the interfaces 310, . . . , 320 within the mobile terminal 300. The mobile terminal 300 may also be used, for example, to receive audio and/or video signals via operation of at least one application in the mobile terminal. The audio signals may comprise, for example, analog and/or digital signals. Similarly, the video signals may comprise, for example, analog and/or digital signals. The mobile terminal 300 may receive audio and/or video signals that may have been broadcast to subscription customers and/or may have been broadcast for reception with no need for subscription. The mobile terminal 300 may also be operable to wirelessly access a network, such as, for example, the Internet, via operation of at least one application in the mobile terminal 300.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for integrating global navigation satellite system (GNSS), wireless local area network (WLAN), and cell phone technology.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A non-transitory computer-readable storage medium comprising executable instructions for performing a method comprising:
   determining a change in location of a communications device to a region of operation;
   determining, based on the change in location, whether the communications device relies upon a different configuration parameter for a first communications standard in the region of operation;
   determining, based at least in part on said change in location, a first update to a configuration parameter for the first communications standard when the communications device is determined to rely upon the different configuration parameter in the region of operation, wherein the first update is stored in the communications device prior to the change in location;
   determining, based on the change in location, a second update to an operational parameter of an application utilizing the first communications standard and executing on the communications device when the application is determined to rely upon a different operational parameter in the region of operation, wherein the operational parameter is independent of the first communications standard;
   configuring said communications device to utilize the first update to said configuration parameter for the first communications standard when the communications device is determined to rely upon the different configuration parameter in the region of operation; and
   configuring the application to utilize the second update to the operational parameter when the application is determined to rely upon the different operational parameter in the region of operation.

2. The non-transitory computer-readable storage medium according to claim 1, the method further comprising determining, based on said change in location, whether said communications device relies upon a second communications standard in said region of operation.

3. The non-transitory computer-readable storage medium according to claim 1, the method further comprising determining, based on said change in location, whether a second application relies upon a second operational parameter in said region of operation.

4. The non-transitory computer-readable storage medium according to claim 1, the method further comprising:
   determining, via a navigation system receiver integrated with or coupled to said communications device, a location of said communications device; and
   determining a country where said communications device is located based on said location.

5. The non-transitory computer-readable storage medium according to claim 4, wherein said navigation system receiver comprises one or more of a global positioning system (GPS) receiver, a Galileo receiver, or a global navigation satellite system (GLONASS) receiver.

6. The non-transitory computer-readable storage medium according to claim 1, wherein configuring said communications device comprises updating at least one radio utilized by said communications device.

7. The non-transitory computer-readable storage medium according to claim 1, the method further comprising communicating at least one of cellular communication signals, audio data, or video data via operation of said application.

8. The non-transitory computer-readable storage medium according to claim 1, wherein said configuration parameter comprises at least one of a power parameter, a decoding parameter, or a frequency parameter.

9. The non-transitory computer-readable storage medium according to claim 1, wherein the determining the first update to the configuration parameter for the first communications standard for use in the region of operation comprises:
   accessing a database stored in the communications device, the database including information associated with at least the first communications standard, wherein the information comprises the first update.

10. The non-transitory computer-readable storage medium according to claim 1, wherein the communications device is inoperable to communicate via the first communications standard without the first update.

11. A method, comprising:
   in a communications device that handles at least one application:
      determining a change in location of said communications device to a region of operation;
      determining, based on the change in location, whether the at least one application relies upon a different operational parameter in the region of operation;
      determining, based at least in part on said change in location:
         an update to an operational parameter when the at least one application is determined to rely upon the different operational parameter in the region of operation, wherein the update is stored in the communications device prior to the change in location, and
         a communications standard for use in the region of operation by said communications device; and
      in response to said change in location, configuring said communications device to:
         update said operational parameter when the at least one application is determined to rely upon the different operational parameter in the region of operation, and
         utilize said communications standard to receive video signals over a network via operation of the at least one application.

12. The method according to claim 11, further comprising:
   determining, via a navigation system receiver integrated with or coupled to said communications device, a location of said communications device; and
   determining a country where said communications device is located based on said location.

13. The method according to claim 12, wherein said navigation system receiver comprises one or more of a global positioning system (GPS) receiver, a Galileo receiver, or a global navigation satellite system (GLONASS) receiver.

14. The method according to claim 11, wherein said operational parameter comprises a digital video broadcasting parameter.

15. A device, comprising:
   one or more processor circuits configured to:
      handle at least one application;
      determine a change in location of the device to a region of operation;
      determine, based on the change in location, whether the at least one application relies upon a different operational parameter in the region of operation;
      determine, based at least in part on the change in location:
         an update to an operational parameter when the at least one application is determined to rely upon the different operational parameter in the region of operation, wherein the update is stored in the device prior to the change in location, and a communications standard for use in the region of operation by the device; and in response to the change in location, configure the device to:

utilize the operational parameter when the at least one application is determined to rely upon the different operational parameter in the region of operation, and utilize the communications standard to receive video signals over a network via operation of the at least one application.

16. The device according to claim 15, wherein the one or more processor circuits are further configured to determine, based on the change in location, whether the device relies upon a second communications standard in the region of operation.

17. The device according to claim 16, wherein the one or more processor circuits are further configured to determine, based on the change in location, whether the device relies upon the different operational parameter for the second communications standard for use in the region of operation.

18. The device according to claim 15, wherein the one or more processor circuits are further configured to:

determine, via a navigation system receiver, a location of the device; and determine a country where the device is located based on the location.

19. The device according to claim 18, wherein the navigation system receiver comprises one or more of a global positioning system (GPS) receiver, a Galileo receiver, or a global navigation satellite system (GLONASS) receiver.

20. The device according to claim 19, wherein, based on the change in location, the one or more processor circuits are further configured to update at least one radio utilized by the device with least one of a power parameter, a decoding parameter, or a frequency parameter.

* * * * *